United States Patent
Benedetti et al.

[11] Patent Number: 6,157,664
[45] Date of Patent: Dec. 5, 2000

[54] SYSTEM TO LOAD PRE-HEATED SCRAP BY MEANS OF BASKETS FOR ELECTRIC ARC FURNACE

[75] Inventors: Giampietro Benedetti, Campoformido; Milorad Pavlicevic, Udine; Alfredo Poloni, Fogliano di Redipuglia; Gianni Gensini, Buia; Angelico Della Negra, Povoletto, all of Italy

[73] Assignee: Danieli & C. Officine Meccaniche SpA, Buttrio, Italy

[21] Appl. No.: 09/381,912

[22] PCT Filed: Mar. 23, 1998

[86] PCT No.: PCT/IB98/00428

§ 371 Date: Sep. 27, 1999

§ 102(e) Date: Sep. 27, 1999

[87] PCT Pub. No.: WO98/46956

PCT Pub. Date: Oct. 22, 1998

[30] Foreign Application Priority Data

Mar. 26, 1997 [IT] Italy .............................. GO97A0008

[51] Int. Cl.⁷ ............................................ F27D 23/00
[52] U.S. Cl. ................................ 373/78; 373/79; 373/80
[58] Field of Search ...................... 373/78–80; 266/142, 266/143, 145

[56] References Cited

U.S. PATENT DOCUMENTS

| | | |
|---|---|---|
| 2,804,295 | 8/1957 | Brooke . |
| 3,385,584 | 5/1968 | Kemmetmueller ........................ 373/78 |
| 4,160,117 | 7/1979 | Schempp ..................................... 373/80 |
| 4,390,168 | 6/1983 | Muller ....................................... 266/142 |
| 4,506,370 | 3/1985 | Yoshimatsu . |
| 4,736,383 | 4/1988 | Meierling ................................... 373/78 |
| 5,106,063 | 4/1992 | Granstrom . |
| 5,390,212 | 2/1995 | Bonnet et al. ............................. 373/79 |
| 5,416,792 | 5/1995 | Vice ........................................... 373/80 |
| 5,602,867 | 2/1997 | Hubers et al. ............................. 373/78 |
| 5,628,958 | 5/1997 | Frank ........................................ 266/143 |

FOREIGN PATENT DOCUMENTS

| | | |
|---|---|---|
| 636698 | 2/1995 | European Pat. Off. . |
| 3243128 | 7/1983 | Germany . |
| 3307400 | 1/1984 | Germany . |
| 2082738 | 3/1982 | United Kingdom . |
| 2110353 | 6/1983 | United Kingdom . |
| 8706331 | 10/1987 | WIPO . |
| 9512690 | 5/1995 | WIPO . |
| 9632616 | 10/1996 | WIPO . |

*Primary Examiner*—Tu Ba Hoang
*Attorney, Agent, or Firm*—Antonelli, Terry, Stout & Kraus, LLP

[57] ABSTRACT

System to load pre-heated scrap by means of baskets for electric arc furnace, the furnace including a movable roof (28), at least one basket (15) loaded with scrap being arranged in a lateral position near the furnace, the basket (15) being associated with a movable covering system (18), there being included at least a pipe (20) connecting the fourth hole of the furnace with the inside of the basket (15) to convey the fumes leaving the furnace (12) with the function of pre-heating the scrap, the pipe (20) being associated with the covering system (18) and able to be moved therewith, the basket (15) being associated with moving means (16a).

16 Claims, 3 Drawing Sheets

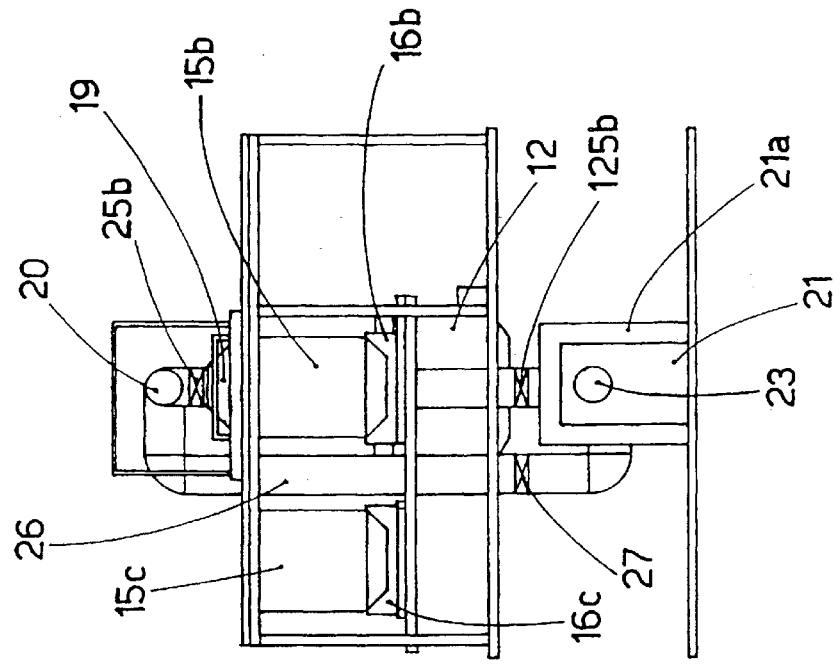
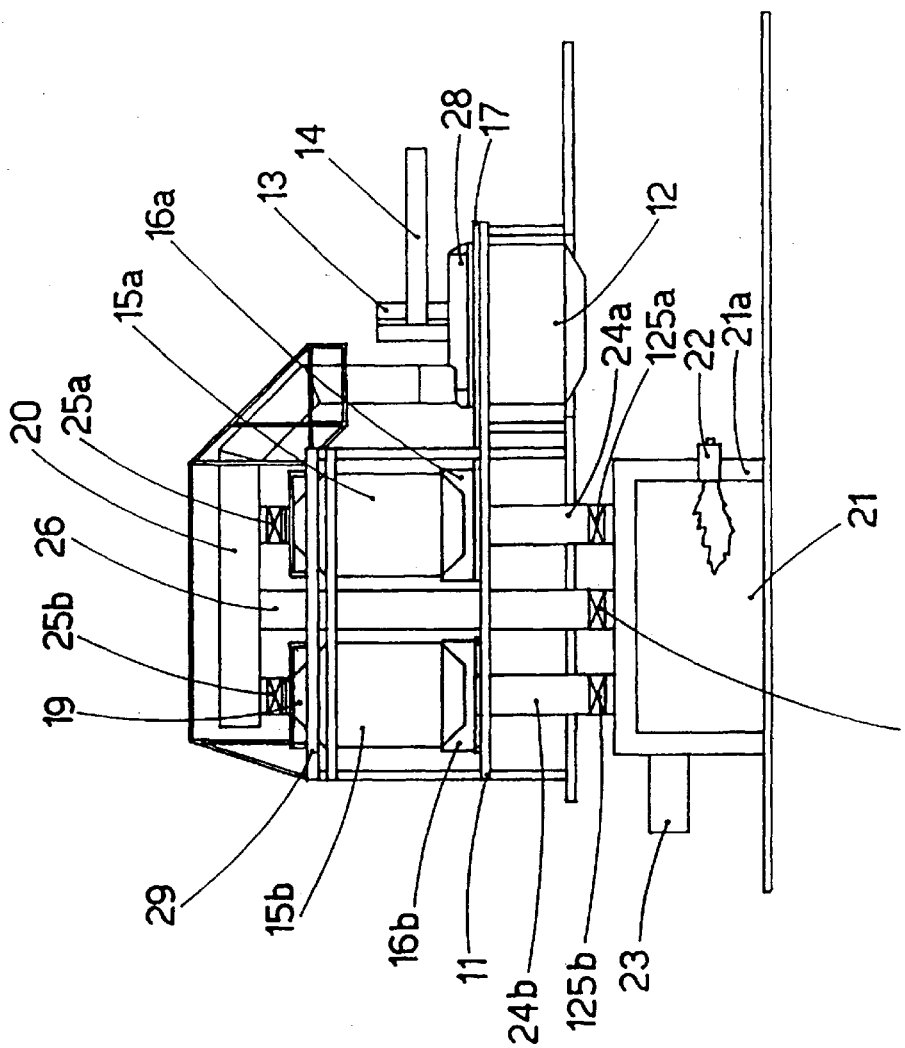

SYSTEM TO LOAD PRE-HEATED SCRAP BY MEANS OF BASKETS FOR ELECTRIC ARC FURNACE

FIELD OF APPLICATION

This invention concerns a system to load pre-heated scrap by means of baskets for an electric arc furnace.

The invention is applied in the field of steel production in order to load, by means of baskets arriving from the scrap storage zone or loaded directly in the pre-heating position, the electric furnaces with scrap, or other prime material similar to scrap, which is pre-heated by means of the fumes coming from the said electric furnaces.

The electric arc furnaces to which the invention is applied can be of the type fed by alternating or direct current.

The invention makes it possible to reduce the times needed to open the roof of the furnace in order to load the furnace, thus limiting the heat losses from inside the furnace towards the outside environment.

Furthermore, the invention makes it possible to load the furnace with scrap which has been heated in the same moving basket used to unload the scrap into the furnace.

Moreover, the invention makes it possible to automate the movements needed for loading, to drastically reduce the times of the cycle, and therefore reduce the downtimes of the furnace, and minimises the spaces required, both horizontally and especially vertically, in order to carry out the pre-heating and loading operations.

The invention may be used both in new installations arranged for the purpose and also in the revamping of existing installations using conventional-type furnaces.

STATE OF THE ART

The state of the art includes electric arc furnaces used to produce steel from scrap and regenerated material of various types.

In the state of the art, the furnaces can be loaded continuously, for example by means of conveying means such as a belt, connected with the inside of the furnace and fed continuously with fresh scrap which gradually replaces that already loaded into the furnace.

In another solution, the furnaces are loaded discontinuously by means of baskets which, in one or more steps, are loaded in a scrap-loading zone and then transported, by lifting and moving means, for example by bridge cranes, in correspondence with the mouth of the furnace which is kept temporally open. The bottom of the basket, which normally consists of movable doors, valves, teeth, sliding retaining grates or other opening systems, is then opened and the material is unloaded inside the furnace.

Systems using baskets for loading the furnace which are known to the state of the art have a plurality of disadvantages.

Firstly, it takes a long time to load the furnace because of the combination of opening movements of the roof and positioning of the baskets; this causes a considerable heat loss from inside the furnace towards the outside, and also the leakage into the surrounding environment of fumes containing powders, particles and other pollutants.

A further disadvantage is that if the scrap is loaded cold into the furnace, it takes longer to melt and causes problems for the penetration of the electrodes.

At present, in some steel plants the furnaces are loaded with scrap which is pre-heated by the heat of the fumes discharged from the furnace itself through the fourth hole on the roof.

Loading systems known to the state of the art where the scrap is pre-heated use loading baskets located in the appropriate rooms into which the fumes are conveyed before they are purified and discharged by the appropriate plants.

There are also solutions known to the state of the art which include a single room which contains several loading baskets, or several rooms connected to each other, each one of which contains a single loading basket. These solutions cause problems in the structuring of the rooms, the movements of the baskets and wear on the baskets too.

Moreover, in the case of baskets heated inside the room, the scrap loses part of the heat it has accumulated, both when it is removed from the room and when it is transported to near the mouth of the furnace and also when it is unloaded into the furnace, from which there is always and in any case a considerable heat loss. The scrap moreover is not heated uniformly from one basket to the next.

These systems furthermore are not very functional, they are very expensive, and they take up a great deal of space inside the plant.

Another disadvantage of this type of loading system is that it is necessary to limit the use of the lifting cranes for the basket to the scrap-loading step, that is-to say, to the melting cycles of the furnace; it is not therefore possible to use the cranes for other purposes required by the steel plant.

A further disadvantage is that the pre-heating rooms are normally located in positions which are not very near the furnace, and therefore the times needed to transport the baskets from this position to the furnace are very long and the heat losses are very high.

There are also systems known to the state of the art which load the furnace with stable containers, which can be moved only from a heating position to one wherein they load the furnace, in which case the containers are loaded either with conveyor belts or with baskets.

U.S. Pat. No. 4,736,383 teaches to heat the scrap with the fumes leaving the furnace and then unload the scrap into the furnace. The scrap is heated from above to below in a stationary, vertical container and the fumes also lap the lower opening means of the container.

According to this document it is necessary to displace the furnace, with all the problems of moving and positioning which that entails. If on the one hand this teaching has the advantage that the scrap is heated in a differentiated manner from top to bottom, on the other hand it is complex, cumbersome, considerably difficult to manipulate, position and center, and has considerable problems of maintenance and management; moreover, the system involves transferring the scrap from the baskets to the vertical stationary container, which causes problems of vertical space.

WO 96/32616 teaches to heat the scrap in a container which is solid with a moving structure, the scrap being heated from the bottom to the top.

This document does not give the advantages of heating the scrap from the top to the bottom; nor is it possible, with this invention, to use the baskets directly as the scrap must be transferred to the container with the consequent problems of vertical space. There is no possibility of acting directly with autonomous baskets, nor is it easy to carry out maintenance operations.

Both these systems, moreover, have the disadvantage that it is necessary to load the stationary containers from above by means of bridge cranes, and this system takes up a considerable amount of vertical space which may not be compatible with the characteristics of the plant where the furnace is to be installed.

Moreover, the loading system incorporating stationary containers involves great operating difficulties, safety problems, movement problems, increases in the cycle times and a whole series of other operating disadvantages.

WO 95/12690 describes a movement system with a rotary tower for containers in which to pre-heat the scrap; the system does not use baskets of the removable type but a substantially stationary single-block structure, which involves obvious limitations to the versatility, flexibility and operativity of the plant.

It is complex and difficult to move the single-block structure, and it requires considerable civil engineering works and very high power supplies.

This embodiment, moreover, is difficult to adapt for use in the revamping of pre-existing plants.

EP 636,698 shows a pre-heating system comprising a carousel device placed in proximity of the furnace and containing three containers for the scrap, two of which are connected in parallel to the fume outlet of the furnace.

This system is used for pre-heating, but the document does not explain the methods for loading the scrap into the furnace which however presumably include transfer by means of a bridge crane; the baskets are presumably transferred from the loading position to the pre-heating position on the carousel by means of a bridge crane.

The baskets are also loaded, in a remote position which is different from the pre-heating position, by means of a bridge crane; this implies considerable vertical space occupied, which will require the adequate structures in the plant.

Moreover, all these transfer operations seriously affect the times of the cycle, which are considerably lengthened for every pre-heating and loading operation.

U.S. Pat. No. 4,506,370 includes a preheating and loading device using a basket or container which can be moved on rails from the pre-heating position to the loading position and vice versa.

This solution does not enable more than one basket to be heated at one time, so that the times of the cycle are consequently extended.

Moreover, the fumes which come out of the basket of scrap are not processed and therefore they carry with them powder and particles, as well as unburnt aromatic compounds, which damage the filters and shorten their working life.

There is also the document EP 287,550 which includes a rotary carousel on which three baskets are located; they pass alternately from a pre-heating position to a scrap loading position after the content has been unloaded into the furnace.

In this solution, however, the baskets are located under the furnace so that, in order to unload the raw materials into the furnace, it is in any case necessary to lift them by means of a bridge crane, and therefore in this solution too considerable vertical space is required in the plant.

All these systems, apart from the above-mentioned disadvantages, also require the installation of specialised, stationary structures, which require long preparation times and take up a great deal of space. Such systems cannot therefore be adopted in a short time and with relatively limited installation costs for the revamping of existing steel works.

The present applicants have therefore designed, tested and embodied this invention to overcome the shortcomings of the state of the art and to obtain further advantages.

DISCLOSURE OF THE INVENTION

The purpose of the invention is to obtain a system to load pre-heated scrap by means of baskets for electric arc furnaces, which will give a plurality of operating and management advantages in the melting cycle of an electric arc furnace.

The term scrap includes other raw material similar to scrap.

The system according to the invention is particularly though not exclusively indicated for the revamping, in a relatively short time and with limited costs, of existing steel works and installations with minimum modifications both on the lay-out of the plant in general and on the furnace itself, without changing the type of functioning and particularly the system to move and rotate the roof.

The invention can however be used also in completely new applications and installations.

To be more exact, the invention can avoid the need to use bridge cranes to transfer the baskets from the pre-heating position to the loading position and vice versa if the vertical dimensions of the plant do not permit it, or in any case make it difficult.

Moreover, the invention can rationalise the steps of pre-arranging the baskets in such a way as to obtain a considerable saving in the times of the cycle.

The invention can also obtain advantages in terms of eliminating the noxious and toxic residues sent to the processing plant, thus extending the working life of the filters.

The invention provides to load into the furnace, by means of baskets, scrap which has been pre-heated by the fumes coming from the fourth hole of the furnace during the melting cycles.

The fumes are conveyed towards the baskets, giving up at least part of their heat energy to the scrap, by means of the appropriate pipes which on the one side are connected with the fourth hole of the furnace and on the other cooperate with the covering system of the baskets which are loaded with scrap.

According to a variant, two baskets are associated simultaneously in parallel with the pipes which convey the pre-heating fumes so that the times of the cycle needed to carry out the pre-heating procedure are considerably shortened.

According to the invention, the baskets loaded with scrap are arranged with rotary platform means arranged on one circumference in such a way that at least one of the baskets is in a position of close proximity with the furnace and substantially aligned with the furnace.

The rotary platform means have two stations, or seatings, where the baskets are arranged, respectively a first pre-heating position where they are prepared for unloading and a second, waiting position.

According to a variant, the rotary platform means have at least two pre-heating and pre-unloading seatings and one or more waiting positions; this is to allow the simultaneous pre-heating of two baskets, thus increasing the flexibility of the system and obtaining a very high energy re-use.

Each basket is associated with respective movable moving means, for example of the trolley type, cooperating with mating guide systems, for example of the type including tracks or rails, or some other similar system, solid with the rotary platform means.

The rotary platform is arranged at such a height that the bottom of the basket is positioned substantially on a level with the roof of the furnace so that the baskets are moved from the pre-heating position on the platform to the loading position above the furnace on a substantially horizontal plane by means of the movable trolley.

There is therefore no need to lift the baskets and therefore there is no need to use cranes, bridge cranes or similar means in order to move the baskets.

The baskets may be autonomous, removable means with respect to the trolley or, according to a variant, they may constitute an integral structure therewith.

In one embodiment of the invention, the pre-heating and pre-unloading seatings are arranged on the platform substantially on the axis of the furnace, whereas the waiting position or positions are displaced sideways with respect to the axis of the furnace.

According to a variant, at least in their pre-heating position, the baskets cooperate at the lower part with systems to discharge the fumes which remove the fumes leaving the bottom of the baskets and convey them towards a lower chamber for collection and sedimentation.

According to a variant, the collection and sedimentation chamber is equipped with burners and also acts as a combustion chamber for the unburnt gaseous residues present in the fumes in such a way that the fumes arrive at the processing system downstream at least partly purified and therefore less dangerous for the filters.

The sequence for loading the furnace includes, in succession, the following steps.

The basket arriving from the scrap loading zone is positioned on the rotary platform means in a waiting position while the loaded basket or baskets,are already in a pre-heating position, aligned with the furnace and ready to be unloaded.

In this pre-heating position, the baskets have their relative covering system in a closed position and are connected with the pipe which is connected to the fourth hole of the furnace which conveys the fumes leaving the furnace inside the basket.

When the first melting cycle of the furnace has finished, the roof is removed from the furnace so as to leave the mouth free.

At this point, the system to cover the baskets, which is associated with the pipe to convey the fumes, is also removed so as to allow the baskets to move freely.

The covering system can be moved rotatably, vertically, or both rotatably and vertically with respect to the basket.

According to a variant, a single covering system is associated with at least the two baskets arranged in the pre-heating and preparation for unloading position.

The basket loaded with pre-heated scrap which is nearest the furnace is translated by means of the relative movable moving means which move on a substantially horizontal plane, into a position above the mouth of the furnace and unloads the pre-heated scrap inside.

The scrap is unloaded by opening the bottom of the basket by means of valves, gratings or similar means.

When unloading is completed, the empty basket is taken back to the original pre-heating position on the rotary platform means.

At this point, the rotary platform means rotate and take the full basket, which was in the waiting position, to the pre-heating and pre-unloading position, whereas the empty basket is taken to a discharge position.

At the same time as the rotary platform rotates, the roof of the furnace closes, thus ensuring a minimum energy loss from inside the furnace, and a new cycle to melt the scrap is begun.

The system to cover the baskets is then returned to a closed position.

The empty basket is removed from the system and transferred to the zone where the scrap is loaded, while a new full basket is placed in the waiting position on the rotary platform means.

According to a variant, the empty basket in the waiting position cooperates with a system to load the scrap which is equipped with a scrap carrier.

This solution makes it possible to considerably limit the times required to move the baskets, and possibly to reduce the number of baskets used.

With this embodiment, moreover, it is possible never to move the basket of the relative moving means and therefore to use integrated basket/trolley structures.

According to a variant, at least some of the baskets used in the loading system according to the invention are of the water-cooled type.

ILLUSTRATION OF THE DRAWINGS

The attached Figures are given as a non-restrictive example and show some preferential embodiments of the invention as follows:

FIG. 1 shows a plane view of a first embodiment of the system to load pre-heated scrap according to the invention;

FIG. 2 shows a variant of FIG. 1;

FIG. 3 shows a side view from A of FIG. 1;

FIG. 4 shows a side view from B of FIG. 2;

FIG. 5 shows a plane view of another variant of FIG. 1;

FIG. 6 shows a partial side view from C of FIG. 5.

DESCRIPTION OF THE DRAWINGS

In the following description, the reference number 10 denotes generally the system according to the invention to load pre-heated scrap using a rotary platform 11 arranged in a position of proximity to the electric arc furnace 12.

To be more exact, FIG. 1 shows an application of the system 10 in cooperation with the slagging-door side of the electric arc furnace 12 while

Figure 2:
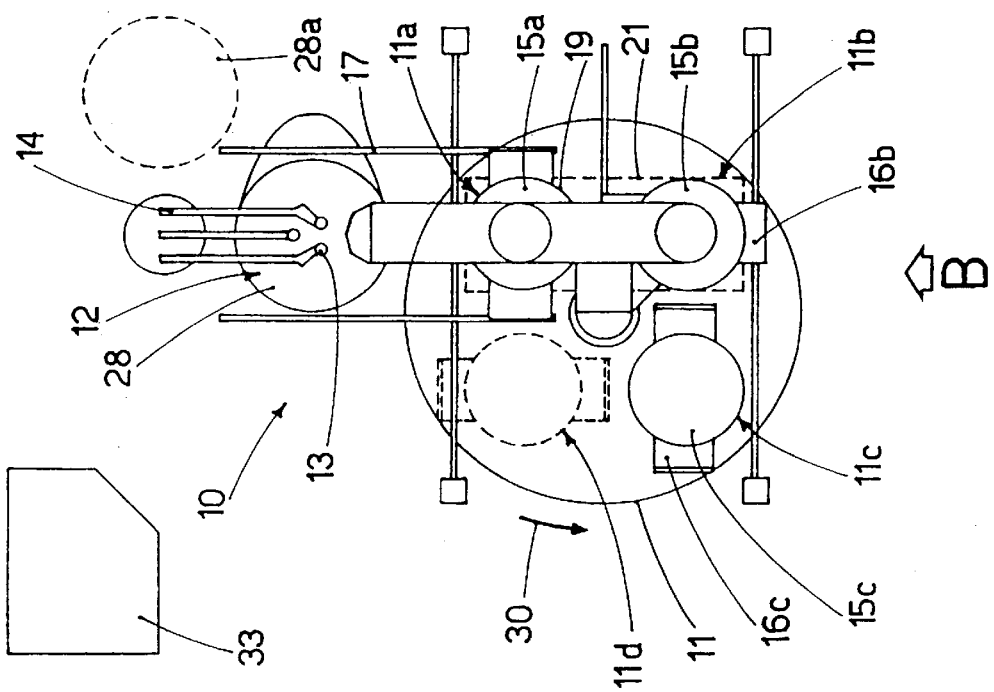
FIG. 2 shows an application cooperating with the side of the fourth hole of the furnace 12.

The rotary platform 11, together with the baskets which it supports and the systems to convey and discharge the fumes which are connected to the baskets, constitutes an extremely compact structure, of limited bulk both horizontal and vertical, which does not require. great works of civil engineering and which therefore can be easily, and relatively rapidly, installed in association with already existing plants which have not been pre-arranged for the purpose.

In the applications shown, the furnace 12 is of the alternating current type and includes three electrodes 13 associated with respective electrode-bearing arms 14.

The rotary platform 11 includes in -this case three positioning seatings, respectively 11*a*, 11*b* and 11*c* for the respective baskets loaded with scrap, shown respectively as 15*a*, 15*b* and 15*c*.

The full baskets 15*a* and 15*b* are in the respective pre-heating and pre-unloading positions 11*a* and 11*b*, while the basket 15*c*, also full, is in the waiting position 11*c*.

It is the same case when the rotary platform 11 of different size and/or structure is able to be associated with one or three or more baskets in the pre-heating position and with two or more baskets in the waiting position.

In their pre-heating and pre-unloading seatings 11*a* and 11*b*, the baskets 15*a* and 15*b* are arranged, in this case, substantially on the axis of the furnace 12 and are mounted on respective trolleys, 16a and 16b, suitable to travel on a substantially horizontal plane on tracks 17 so as to perform movements towards and away from the furnace 12.

In the pre-heating and pre-unloading position, each basket 15a, 15b cooperates with a movable covering system 18 which includes an air-tight cover 19 for each of the baskets 15a, 15b.

The covering system 18 is movable and can be released from the relative baskets 15a, 15b, for example rotatably and/or vertically, during the steps of transferring the baskets from the pre-heating position to the position where the scrap is unloaded into the furnace.

A pipe 20 connects the fume outlet hole, or fourth hole, of the furnace 12 to the covering system 18 to convey the fumes leaving the furnace 12 inside the baskets 15a, 15b in order to pre-heat the scrap contained therein, lapping it from the top to the bottom.

According to a variant, the pipe 20 is cooled.

The fumes, after lapping the scrap contained in the baskets 15a, 15b and after giving up at least part of their heat energy, are taken from the bottom of the baskets 15a, 15b, consisting of movable and cooled grids or valves which allow the fumes to pass, and sent by means of respective pipes 24a and 24b inside a collection and sedimentation chamber 21 which, in this case, also acts as a post-combustion chamber.

The collection and sedimentation chamber 21 can be located either directly below the seatings 11a and 11b, with the baskets 15a, 15b in the pre-heating and pre-unloading position, or below the seatings 11c, 11d, according to the existing lay-out and the requirements of installation, by providing the appropriate connection ducts.

The collection and sedimentation chamber 21 is associated with a plurality of burners 22 attached to its side walls 21a and is connected with at least a discharge conduit 23.

The noxious content of the fumes, for example residual CO or various organic compounds, is at least partly abated by the post-combustion process in the collection and sedimentation chamber 21; the fumes are then sent, by means of the discharge conduit 23, to the systems of further treatment and to the chimney.

On the conduits which connect the pipe 20 to convey the fumes with the inside of the baskets 15a, 15b and on the pipes 24a, 24b which cooperate with the apertures to discharge the fumes in the baskets 15a, 15b, there are respective interception means 25a, 25b at the inlet and 125a, 125b at the outlet.

Connected with the pipe 20 there is also another pipe 26, equipped with its own interception means 27, which is directly connected with the collection and sedimentation chamber 21, in correspondence with the axis of rotation of the rotary platform 11.

In the event that the pre-heating system should be put temporarily out of use or disactivated for whatsoever reason, the interception means 25a and 25b are closed, and the interception means 27 are opened, thus causing the baskets 15a, 15b to be by-passed, and the fumes are conveyed directly from the furnace 12 to the collection and sedimentation chamber 21.

In this way, every operational or emergency situation can be dealt with without having to switch off or close down the furnace 12.

Figure 1:
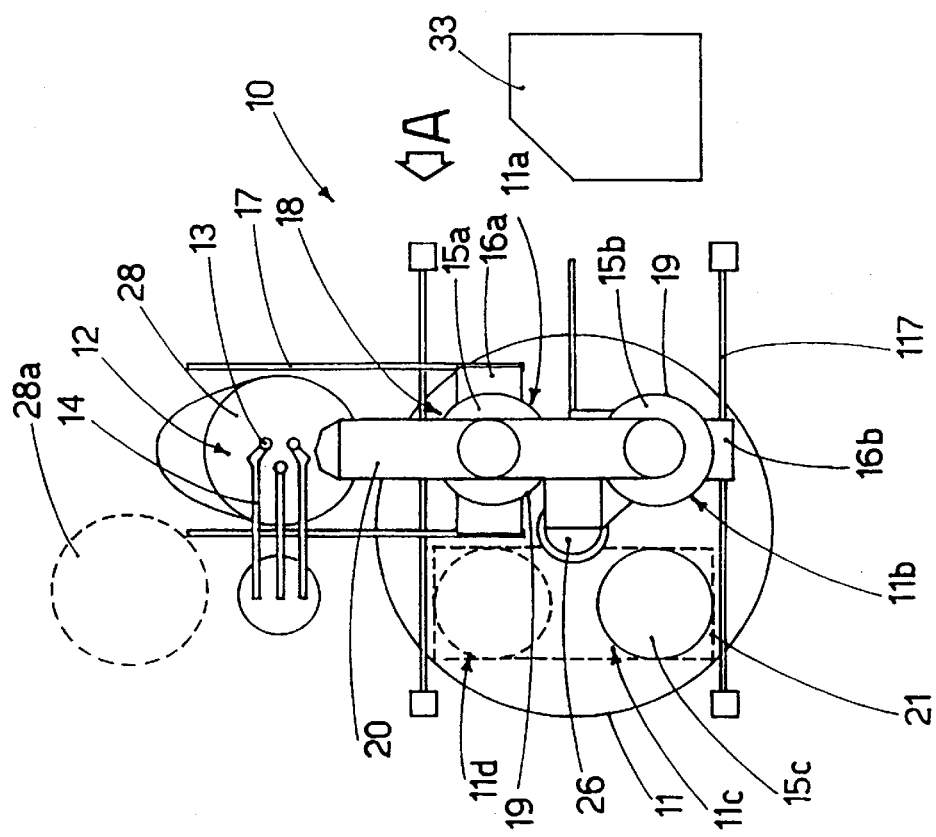

During the operational step, when the furnace 12 has finished its cycle of melting the scrap loaded during the previous step, the roof 28 is removed and taken to a position of non-contact, shown by a line of dashes 28a in FIGS. 1 and 2.

Additionally, the covering system 18 comprising the covers, or hoods 19 which hermetically cover the tops of the baskets 15a, 15b and the cooled pipe 20, are translated by means of the relative movable trolley 29 so as to allow the full basket 15a to move freely.

The movable trolley 16a then translates the basket 15a on the relative tracks 17 until it cooperates with the mouth of the furnace 12 which is momentarily open.

The bottom of the basket 15a is opened, in a manner known to the state of the art, and the scrap inside the basket is unloaded into the furnace 12.

When the unloading is completed, the basket 15a is taken back to its original position.

At this point, the rotary platform 11 rotates in the direction shown by the reference number 30, in this case by 90°, and takes the basket 15b, with the relative movable trolley 16b to position 11a which was previously occupied by the basket 15a, and basket 15c, with the relative movable trolley 16c, to position 11b previously occupied by basket 15b.

The covering system 18, together with the cooled pipe 20 to convey the fumes, is taken back to the operational position and thus closes at the top and seals the full baskets 15b and 15c.

The empty basket 15a, with the relative movable trolley 16a, is displaced in correspondence with the seating 11d.

The empty basket 15a, in a first embodiment, can be removed from the rotary platform 11, for example by means of a bridge crane if the dimensions and the structure of the plant allow, and be replaced by a new, full basket arriving from the scrap-loading zone, this new basket being placed in the waiting position 11c.

In this way, the cycle can proceed substantially without any interruption until the end of the melting cycle of the furnace 12.

Figure 5:
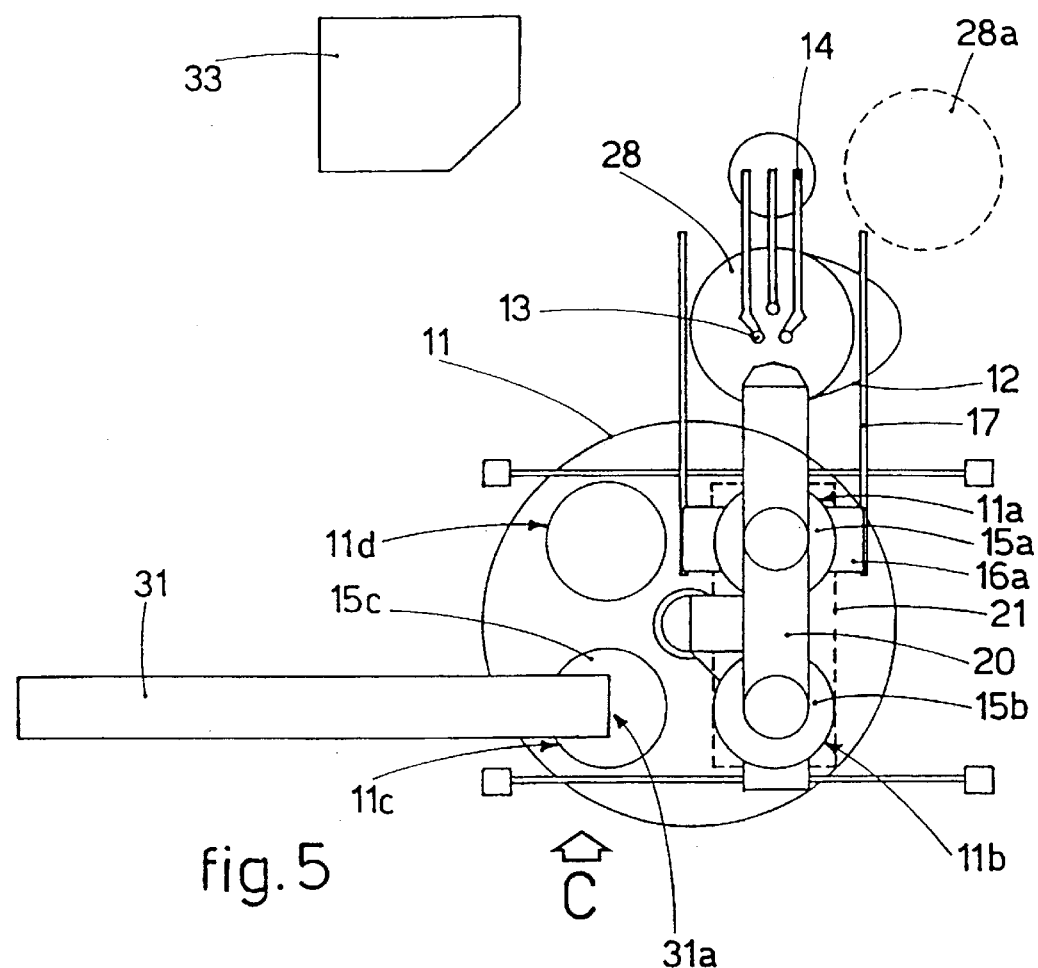
Figure 6:
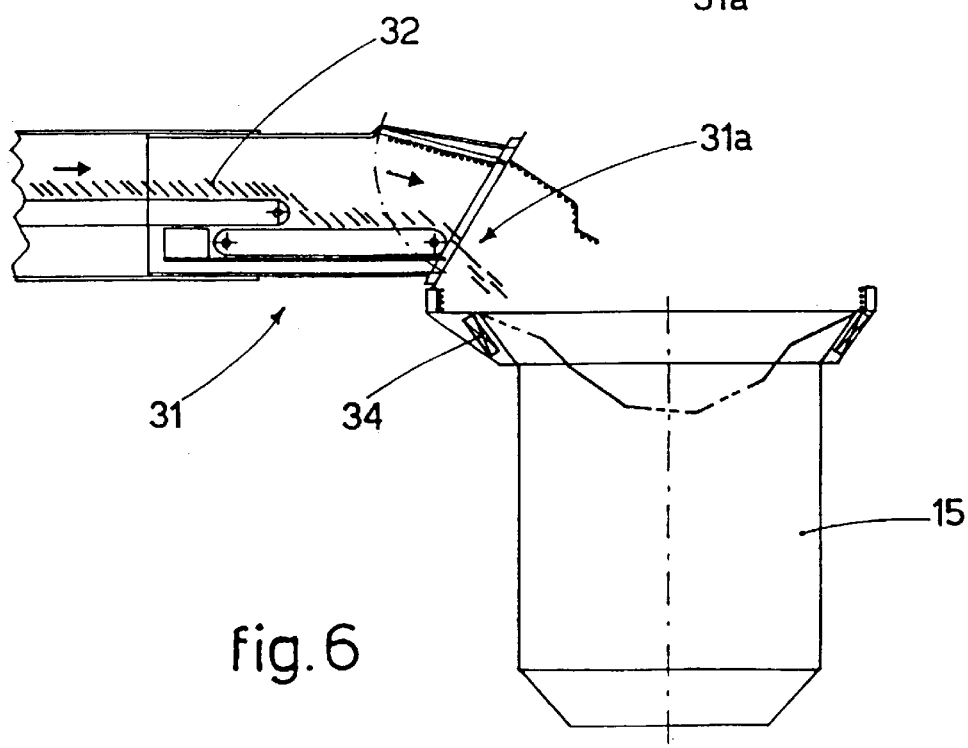

According to the variant shown in FIGS. 5 and 6, which uses a rotary platform 11 with four baskets, the empty basket 15c, in the waiting position 11c, is loaded by means of a conveyor belt 31 which has the outlet end 31a cooperating with the mouth of the empty basket 15c.

The basket 15c is then filled with scrap 32 without needing to be moved from its position on the rotary platform 11.

When the furnace 12 has been loaded by means of the basket 15a, the empty basket 15a is taken to a waiting position lid, by the rotary platform 11 rotating through 90°.

The 90° rotation takes the basket 15b to the pre-heating position 11a in proximity to the furnace 12, ready for unloading into the furnace; the basket 15c is taken to the pre-heating position 11b behind basket 15b, and basket 15d is taken to the loading position lic under the conveyor belt 31.

According to a variant not shown here, the rotary platform 11 has three positioning seatings and each rotation following each unloading cycle into the furnace 12 covers an angle of 120°.

The conveyor belt 31 includes, according to a variant, a rotary distributor element 34 which serves to regulate and make uniform the distribution of the scrap 32 inside the basket 15, preventing the material from accumulating and piling up at specific points of the basket 15.

In one embodiment of the invention, the rotary distributor element 34 is of the magnetic type.

According to a variant, the rotary distributor element 34 is of the mechanical type.

The whole loading cycle of the furnace 12 including the pre-heating of the scrap can therefore be carried out with an extremely limited number of baskets 15, three in this case, and with extremely limited movements.

The whole system can be automated and all the steps of the cycle can be managed and controlled from the command post 33.

The covering system 18, together with the cooled pipe 20, can be removed from the zone immediately around the furnace 12 by using the tracks 117 so as to allow routine or special maintenance both on parts or components of the furnace 12 and on parts or components of the pre-heating system 10.

What is claimed is:

1. System to load pre-heated scrap by means of baskets into an electric arc furnace, the furnace including a roof which is moved from a closed position to a position of non-contact, there being included on the roof a fourth hole to discharge fumes, at least one basket loaded with scrap being arranged in a lateral position on respect of the furnace, the basket being associated with a covering system which is moved from a closed position to at least one position of non contact, there being included at least a pipe connecting the fourth hole of the furnace with the inside of the basket to convey the fumes leaving the furnace to the inside the basket as a function of pre-heating the scrap contained in the basket, the pipe being associated with the covering system and being moved therewith, the bottom of the basket being at least partly openable and associated with relative moving means, the system being characterized in that it comprise a rotary platform defining a first position, for a first basket, of pre-heating and pre-arranging for unloading of the scrap into the furnace and a second position, for a second basket, of waiting, the baskets on the platform being mounted on a respective movable trolley able to translate each basket, when the basket is in said first position toward a mouth of the furnace in order to unload the pre-heated scrap into the furnace, and to move back each basket in said first position after the unloading of the scrap into the furnace, said unloading being performed by the opening of the bottom of the basket, after each unloading cycle the baskets exchanging their respective positions by means of the rotation of the rotary platform, the rotary platform defining a positioning of the baskets with the relative bottom substantially on a level with the mouth of the furnace, there being included below the basket in the first position a chamber for the collection and sedimentation of fumes through which the fumes pass and are possibly combusted after leaving the baskets located in the first position.

2. System as in claim 1, characterized in that said rotary platform defines at least two pre-heating and pre-unloading positions occupied by respective baskets arranged on an axis with the furnace and subjected, in parallel, simultaneously to pre-heating.

3. System as in claim 1, characterized in that at least in the waiting position an empty basket cooperates with means for removing the empty basket from the rotary platform.

4. System as in claim 1, characterized in that at least in the waiting position an empty basket cooperates with means to load the scrap into the empty basket.

5. System as in claim 4, characterized in that the means to load the scrap comprises a conveyer belt and a rotary distributor element to uniformly distribute the scrap.

6. System as in claim 1, characterized in that between the pipe and the covering system there are respective means to intercept the fumes which are momentarily activated.

7. System as in claim 1, characterized in that the covering system is rotatably and vertically movable.

8. System as in claim 1, characterized in that between a lower part of each basket and the chamber for the collection and sedimentation of the fumes there are respective means to intercept the fumes which are momentarily activated.

9. System as in claim 1, characterized in that the pipe communicates directly with the chamber for the collection and sedimentation of the fumes by means of a pipe equipped with its own means to intercept the fumes which are momentarily activated.

10. System as in claim 9, characterized in that includes means to divert the fumes directly from the fourth hole of the furnace into the chamber for the collection and sedimentation of the fumes through the pipe by-passing the basket located in the first position.

11. System as in claim 1, characterized in that the collection and sedimentation chamber also functions as a post-combustion chamber for the fumes.

12. System as in claim 11, characterized in that the collection and sedimentation chamber is equipped with post-combustion burners.

13. System as in claim 1, characterized in that at least one basket is cooled.

14. System as in claim 1, characterized in that the pipe to convey the fumes from the furnace to the basket in the first position is cooled.

15. System as in claim 1, characterized in that the fumes flow inside the basket in the first position through the scrap from the top downwards.

16. System as in claim 1, characterized in each basket includes apertures on a bottom of the basket through which to discharge the fumes.

* * * * *